(12) United States Patent
Takeuchi et al.

(10) Patent No.: US 8,751,697 B2
(45) Date of Patent: Jun. 10, 2014

(54) METHOD OF MONITORING THE STATUS OF A PERIPHERAL DEVICE, AND A COMPUTER AND NETWORK SYSTEM

(71) Applicant: Seiko Epson Corporation, Tokyo (JP)

(72) Inventors: Yasuhiro Takeuchi, Hanishinagun (JP); Hiroyuki Nagasawa, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 13/662,114

(22) Filed: Oct. 26, 2012

(65) Prior Publication Data

US 2013/0111072 A1 May 2, 2013

(30) Foreign Application Priority Data

Oct. 27, 2011 (JP) ................................. 2011-235734

(51) Int. Cl.
*G06F 3/00* (2006.01)
*G06F 9/00* (2006.01)

(52) U.S. Cl.
USPC ............. 710/15; 710/8; 713/2; 709/223

(58) Field of Classification Search
CPC ....................................................... G06F 3/00
USPC ................... 710/15, 8; 713/2; 709/223
See application file for complete search history.

(56) References Cited

U.S. PATENT DOCUMENTS

| 6,029,198 | A  | * | 2/2000  | Iizuka .......................... 709/223 |
| 6,598,096 | B1 | * | 7/2003  | Oi et al. .......................... 710/10 |
| 6,701,442 | B1 | * | 3/2004  | Kunz et al. ..................... 713/300 |
| 6,985,990 | B2 | * | 1/2006  | Bronson et al. ............... 710/306 |
| 7,609,690 | B2 | * | 10/2009 | Ogata ............................ 370/389 |
| 2007/0168652 | A1 | * | 7/2007 | Mylly et al. ...................... 713/2 |

FOREIGN PATENT DOCUMENTS

| JP | 10-049314 A   | 2/1998  |
| JP | 2002-358182 A | 12/2002 |
| JP | 2007-052488 A | 3/2007  |
| JP | 2010-134806 A | 6/2010  |

* cited by examiner

*Primary Examiner* — Christopher Shin
(74) *Attorney, Agent, or Firm* — Kilpatrick Townsend & Stockton LLP

(57) ABSTRACT

A network system enables monitoring the status of peripheral devices from computers without concentrating a load on the network. A specific device driver that runs on a specific computer connected to the network has an initialization command transmission unit that sends a first initialization command to the specific printer when a process command is sent to a specific printer, and an operating status monitoring unit that, after initialization based on the first initialization command is completed, monitors the operating status of the specific printer until the printer power turns off. Because the specific computer does not initialize and does not monitor the operating status of the specific printer until the computer sends a process command, concentrating a load on the network is avoided when the network system starts up.

17 Claims, 4 Drawing Sheets

METHOD OF MONITORING THE STATUS OF A PERIPHERAL DEVICE, AND A COMPUTER AND NETWORK SYSTEM

Priority is claimed under 35 U.S.C. §119 from Japanese patent application no. JP 2011-235734 filed on Oct. 27, 2011 which is hereby incorporated by reference in their entirety.

BACKGROUND

1. Technical Field

The present invention relates to a method of monitoring the status of peripheral devices in a network system having multiple peripheral devices and multiple computers connected over a network from the computers without concentrating a load on the network. The invention also relates to a computer and a network system whereby the status of peripheral devices can be monitored from the computer without concentrating a load on the network.

2. Related Art

Japanese Unexamined Patent Appl. Pub. JP-A-H10-49314 describes a network system having a computer connected to a plurality of printers over a LAN. JP-A-H10-49314 describes a status response process that is executed when the network system starts up. In the status response process each computer sends a status request to each of the plural printers. Each printer then determines and sends its own status to each computer.

When the status response process runs during startup, network traffic increases greatly due to the concentration of packets sent over the network. These packets include packets sent from each computer to each printer requesting the startup status of the printer, packets sent from each printer to each computer in response to the request, packets to initialize communication between each printer that responded and each computer, and packets enabling each computer to acquire the status of each initialized printer. As a result, the startup time until the network system can actually be used becomes longer.

SUMMARY

The present invention provides a method of monitoring the status of a peripheral device in a network system having multiple printers or other peripheral devices and computers connected over a network enables monitoring peripheral device status from the computers without imposing a concentrated load on the network. The invention also provides a computer that can monitor the status of peripheral devices without concentrating a load on the network, and a network system.

One aspect of the invention is a method of monitoring the status of a peripheral device on a network having connected thereto at least one computer and one peripheral device, wherein a specific computer: sends a first initialization command to initialize communication with a specific peripheral device when first sending a process command causing the specific peripheral device to perform an operation; and when the specific peripheral device is initialized based on the first initialization command, monitors the operating status indicating the operating state of the specific peripheral device until the power of the specific peripheral device turns off.

The invention initializes communication between the specific peripheral device and the specific computer when a specific computer connected to a network first sends a process command to a specific peripheral device connected to the network. Once the specific peripheral device is initialized, the specific computer starts monitoring the operating status of the specific peripheral device. In other words, when each computer turns on in this aspect of the invention, initialization of a specific peripheral device by a specific computer does not happen and the computers do not monitor the operating status of a particular peripheral device until a specific computer sends a process command to a specific peripheral device. Concentrating packets for initializing the peripheral devices and packets for monitoring the operating status of the peripheral devices on the network can therefore be prevented when the computers turn on and the network system starts operating. Concentration of a load on the network can therefore be suppressed.

When the power of a specific peripheral device changes from on to off, the specific computer stops monitoring the operating status of the specific peripheral device. The number of packets traversing the network to monitor peripheral device status can therefore be suppressed. In addition, because a specific computer monitors the operating status of a specific peripheral device until the power of the specific peripheral device turns off after the specific peripheral device is initialized, the specific computer can know the operating status of the specific peripheral device when the specific peripheral device is performing another operation based on a process command from another computer connected to the network. For example, if an error occurs in the specific peripheral device while executing an operation based on a process command from another computer, the specific computer can also know that an error occurred. The operating statuses of the peripheral devices monitored by the computers include a busy status indicating that the peripheral device is performing an operation; an error status indicating that an error occurred in the peripheral device; and a power-off status indicating that the power of the peripheral device changed from on to off.

Further preferably in another aspect of the invention, the specific computer monitors a first startup status that indicates the power of the specific peripheral device changed from off to on when the specific peripheral device is not initialized based on the first initialization command; resends the first initialization command when the first startup status is detected; and monitors the operating status of the specific peripheral device until the power of the specific peripheral device turns off after the specific peripheral device is initialized based on the first initialization command.

The specific peripheral device not being initialized based on the first initialization command happens when the power of the specific peripheral device was off when the specific computer sent the first process command. In this case, if the specific computer monitors the first startup status of the specific peripheral device, and resends the first initialization command when the first startup status is detected, initialization is done when the power of the specific peripheral device changes from off to on. The specific computer can then start monitoring the operating status because communication is established between the specific computer and the specific peripheral device. In addition, because communication is established between the specific computer and the specific peripheral device by initialization, process commands that were not processed by the specific printer and queued on the specific computer are sent by the specific computer with the first initialization command, and the process can be executed based on the process command by the specific peripheral device without delay when the power of the specific peripheral device turns on.

Further preferably in another aspect of the invention, the specific computer: sends a second initialization command to initialize communication with a specific peripheral device when a second or later process command is sent to the specific peripheral device and the operating status and first startup status of the specific peripheral device are not being monitored; and monitors the operating status of the specific peripheral device until the power of the specific peripheral device turns off after the specific peripheral device is initialized based on the second initialization command.

The process command sent from a specific computer to a specific peripheral device being the second or later process command, and the operating status or first startup status of the specific peripheral device not being monitored by the specific computer when the process command is sent, happens when the power of the specific peripheral device was on when the specific computer sent the first process command to the specific peripheral device, and the specific computer was monitoring the operating status of the specific peripheral device, but the power of the specific peripheral device then turned off and monitoring the operating status stopped. In this case, if the specific computer sends the second initialization command with the process command, and the specific peripheral device then turns on, the specific peripheral device will be initialized based on the second initialization command. Because communication between the specific computer and the specific peripheral device is thus established, the specific computer can start monitoring the operating status. Furthermore, because communication between the specific computer and specific peripheral device is established by initialization, the specific peripheral device that turned on can execute the operation based on the process command without delay as a result of the specific computer sending the process command that was not executed by the specific printer and is queued on the specific computer with the second initialization command.

Further preferably in another aspect of the invention, the specific computer monitors a second startup status that indicates the power of the specific peripheral device changed from off to on when the specific peripheral device is not initialized based on the second initialization command; resends the second initialization command when the second startup status is detected; and monitors the operating status of the specific peripheral device until the power of the specific peripheral device turns off after the specific peripheral device is initialized based on the second initialization command.

The specific peripheral device not being initialized based on the second initialization command happens when the power of the specific peripheral device was on and the specific computer was monitoring the operating status, but the specific peripheral device then turned off, the specific computer stopped monitoring the operating status, and the specific peripheral device is still off when the specific computer then sends a second or later process command. In this case, if the specific computer monitors the second startup status of the specific peripheral device and resends the second initialization command and process command when the second startup status is detected, the specific peripheral device is initialized based on the second initialization command when the power of the specific peripheral device then turns on again. The specific computer can then start monitoring the operating status because communication is established between the specific computer and the specific peripheral device. In addition, because communication is established between the specific computer and the specific peripheral device by initialization, process commands that were not processed by the specific printer and queued on the specific computer are sent by the specific computer with the second initialization command, and the process can be executed based on the process command by the specific peripheral device without delay when the power of the specific peripheral device turns on.

Further preferably in another aspect of the invention, the specific computer does not monitor the operating status of the specific peripheral device and the startup status that indicates the power of the specific peripheral device changed from off to on until the specific computer sends a process command to the specific peripheral device for the first time after the power of the specific computer changes from off to on.

Concentrating packets for monitoring the startup status and packets for monitoring the operating status of the peripheral devices on the network can therefore be prevented when the computers turn on and the network system starts operating. Concentration of a load on the network can therefore be suppressed.

Further preferably in another aspect of the invention, the specific computer does not monitor the operating status of the specific peripheral device and the startup status that indicates the power of the specific peripheral device changed from off to on after detecting based on the operating status that the power of the specific peripheral device turned off until the specific computer sends a new process command to the specific peripheral device.

The load on the network can therefore be reduced because the number of packets for monitoring the startup status and packets for monitoring the operating status of the peripheral devices can be reduced.

Further preferably in another aspect of the invention, the peripheral device is a printer; and the process command is a print command causing the printer to print.

Increasing the startup time until each printer can actually be used when the computers turn on and the network system starts operating can therefore be prevented.

Another aspect of the invention is a computer on which operates a device driver that controls driving a peripheral device over a network to which at least one peripheral device and one computer are connected, the device driver including: a decision unit that determines if a process command is the first process command sent to a specific peripheral device when a process command to perform an operation is sent to a specific peripheral device that is controlled by the device driver; an initialization command transmission unit that sends a first initialization command to initialize communication between the device driver and the specific peripheral device when the process command is the first process command; and an operating status monitoring unit that, when initialization based on the first initialization command is completed, monitors the operating status indicating the operating state of the specific peripheral device until the power of the specific peripheral device turns off.

The invention initializes communication between a specific peripheral device and the device driver when a device driver running on a specific computer connected to a network first sends a process command to a specific peripheral device that is controlled by the device driver. Once the specific peripheral device is initialized, the device driver starts monitoring the operating status of the specific peripheral device. In other words, when each computer turns on in this aspect of the invention, initialization of a specific peripheral device by a specific computer does not happen and the computers do not monitor the operating status of any particular peripheral device until a process command is sent from a specific computer to a specific peripheral device. Concentrating packets for initializing the peripheral devices and packets for monitoring the operating status of the peripheral devices on the network can therefore be prevented when the computers turn on and the network system starts operating. Concentration of a load on the network can therefore be suppressed.

When the power of a specific peripheral device changes from on to off, the device driver stops monitoring the operating status of the specific peripheral device. The number of packets traversing the network to monitor peripheral device status can therefore be suppressed. For example, if an error occurs in the specific peripheral device while executing an operation based on a process command from another computer, the specific computer can also know that an error occurred. The operating statuses of the peripheral devices monitored by the computers include a busy status indicating that the peripheral device is performing an operation; an error status indicating that an error occurred in the peripheral device; and a power-off status indicating that the power of the peripheral device changed from on to off.

A computer according to another aspect of the invention preferably also has a startup status monitoring unit that monitors a first startup status that indicates the power of the specific peripheral device changed from off to on when the specific peripheral device is not initialized based on the first initialization command; a retransmission unit that resends the first initialization command when the first startup status is detected.

The specific peripheral device not being initialized based on the first initialization command happens when the power of the specific peripheral device was off when the first process command was sent from the device driver. In this case, if the device driver monitors the first startup status of the specific peripheral device, and resends the first initialization command when the first startup status is detected, initialization is done when the power of the specific peripheral device changes from off to on. The device driver can then start monitoring the operating status because communication is established between the device driver and the specific peripheral device. In addition, because communication is established between the device driver and the specific peripheral device by initialization, process commands that were not processed by the specific printer and queued on the specific computer on which the device driver runs are sent with the first initialization command, and the operation can be executed based on the process command by the specific peripheral device without delay when the power of the specific peripheral device turns on.

In a computer according to another aspect of the invention, the initialization command transmission unit sends a second initialization command to initialize communication between the device driver and the specific peripheral device when the device driver sends the process command to the specific peripheral device if the process command is not the first process command sent to the specific peripheral device, the startup status monitoring unit is not monitoring the first startup status, and the operating status monitoring unit is not monitoring the operating status; and the operating status monitoring unit monitors the operating status of the specific peripheral device until the power of the specific peripheral device turns off after the specific peripheral device is initialized based on the second initialization command.

The process command sent from a device driver to a specific peripheral device being the second or later process command, and the startup status monitoring unit or the operating status monitoring unit not monitoring the specific peripheral device, happens when the power of the specific peripheral device was on when the first process command was sent by the device driver to the specific peripheral device and the operating status was being monitored, but the power of the specific peripheral device then turned off and monitoring the operating status stopped.

In this case, if the second initialization command is sent with the process command, and the specific peripheral device then turns on, the specific peripheral device will be initialized based on the second initialization command. Communication between the specific computer and the specific peripheral device is thus established, and monitoring the operating status can start. Furthermore, because communication between the device driver and specific peripheral device is established by initialization, the specific peripheral device that turned on can execute the operation based on the process command without delay as a result of sending the process command that was not executed by the specific printer and is queued by the device driver with the second initialization command.

In a computer according to another aspect of the invention, the startup status monitoring unit monitors a second startup status that indicates the power of the specific peripheral device changed from off to on when the specific peripheral device is not initialized based on the second initialization command; and the retransmission unit resends the second initialization command when the second startup status is detected.

The specific peripheral device not being initialized based on the second initialization command happens when the power of the specific peripheral device was on and the operating status was being monitored, but the specific peripheral device then turned off, the monitoring the operating status stopped, and the specific peripheral device was still off when a second or later process command was sent to the specific peripheral device. In this case, if the device driver monitors the second startup status of the specific peripheral device and resends the second initialization command and process command when the second startup status is detected, the specific peripheral device is initialized based on the second initialization command when the power of the specific peripheral device then turns on again. Monitoring the operating status can then start because communication is established between the specific computer and the specific peripheral device. In addition, because communication is established between the device driver and the specific peripheral device by initialization, process commands that were not processed by the specific printer and queued by the device driver are sent with the second initialization command, and the operation can be executed based on the process command by the specific peripheral device without delay when the power of the specific peripheral device turns on.

Another aspect of the invention is a network system having at least one computer and one peripheral device connected over a network, wherein: when a process command causing a specific peripheral device to perform an operation is first sent from a specific computer, a first initialization command to initialize communication between the specific computer and the specific peripheral device is sent from the specific computer; and when the specific peripheral device is initialized based on the first initialization command, the specific computer monitors the operating status indicating the operating state of the specific peripheral device until the power of the specific peripheral device turns off.

In other words, in a network system having at least one computer and one peripheral device connected over a network, a device driver that controls driving the peripheral device operates on the computer, and the device driver includes a decision unit that determines if a process command is the first process command sent to a specific peripheral device when a process command to perform an operation is sent to a specific peripheral device that is controlled by the device driver; an initialization command transmission unit that sends a first initialization command to initialize communication between the device driver and the specific peripheral device when the process command is the first process command; and an operating status monitoring unit that, when initialization based on the first initialization command is completed, monitors the operating status indicating the operating state of the specific peripheral device until the power of the specific peripheral device turns off.

Effect of the Invention

When each computer connected to a network turns on, initialization of a specific peripheral device by a specific computer does not happen and the computers do not start monitoring the operating status of any particular peripheral device until a specific computer sends a process command to a specific peripheral device. Concentrating packets for initializing the peripheral devices and packets for monitoring the operating status of the peripheral devices on the network can therefore be prevented when the computers turn on and the network system starts operating. Concentration of a load on the network can therefore be suppressed. When the power of a specific peripheral device on the network changes from on to off, the computer stops monitoring the operating status of the specific peripheral device. The number of packets traversing the network to monitor peripheral device status can therefore be suppressed. In addition, because the computer monitors the status of the specific peripheral device until the power of the specific peripheral device turns off after a specific peripheral device is initialized, the specific computer can know the operating status of the specific peripheral device when the specific peripheral device is operating according to a process command from another computer on the network.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a network system according to the present invention is described below with reference to the accompanying figures.

Network System

Figure 1:
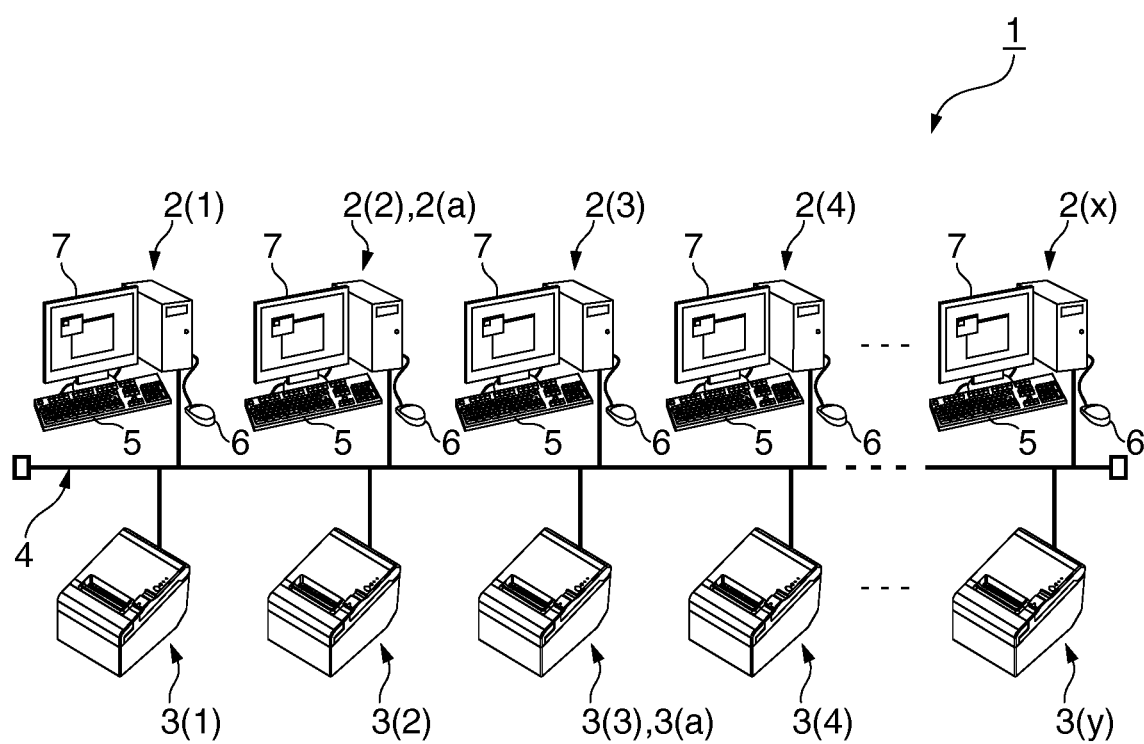
FIG. 1 shows the configuration of a network system according to the invention.

FIG. 1 shows the configuration of a network system according to the invention. The network system 1 includes a plurality of computers 2(1) to 2(x), a plurality of printers (peripheral devices) 3(1) to 3(y), and a network 4 connecting the computers 2(1) to 2(x) and printers 3(1) to 3(y). In this embodiment of the invention the network 4 is an Ethernet (R) LAN installed in an office or hospital, for example, and uses TCP/IP as the communication protocol. The network system 1 in this embodiment has, for example, 200 or more computers 2(1) to 2(x) and 50 or more printers 3(1) to 3(y) connected over the network 4. A keyboard 5 and mouse 6 are connected as input devices, and a display 7 is connected as an output device, to each computer 2(1) to 2(x).

Control System

Figure 2:
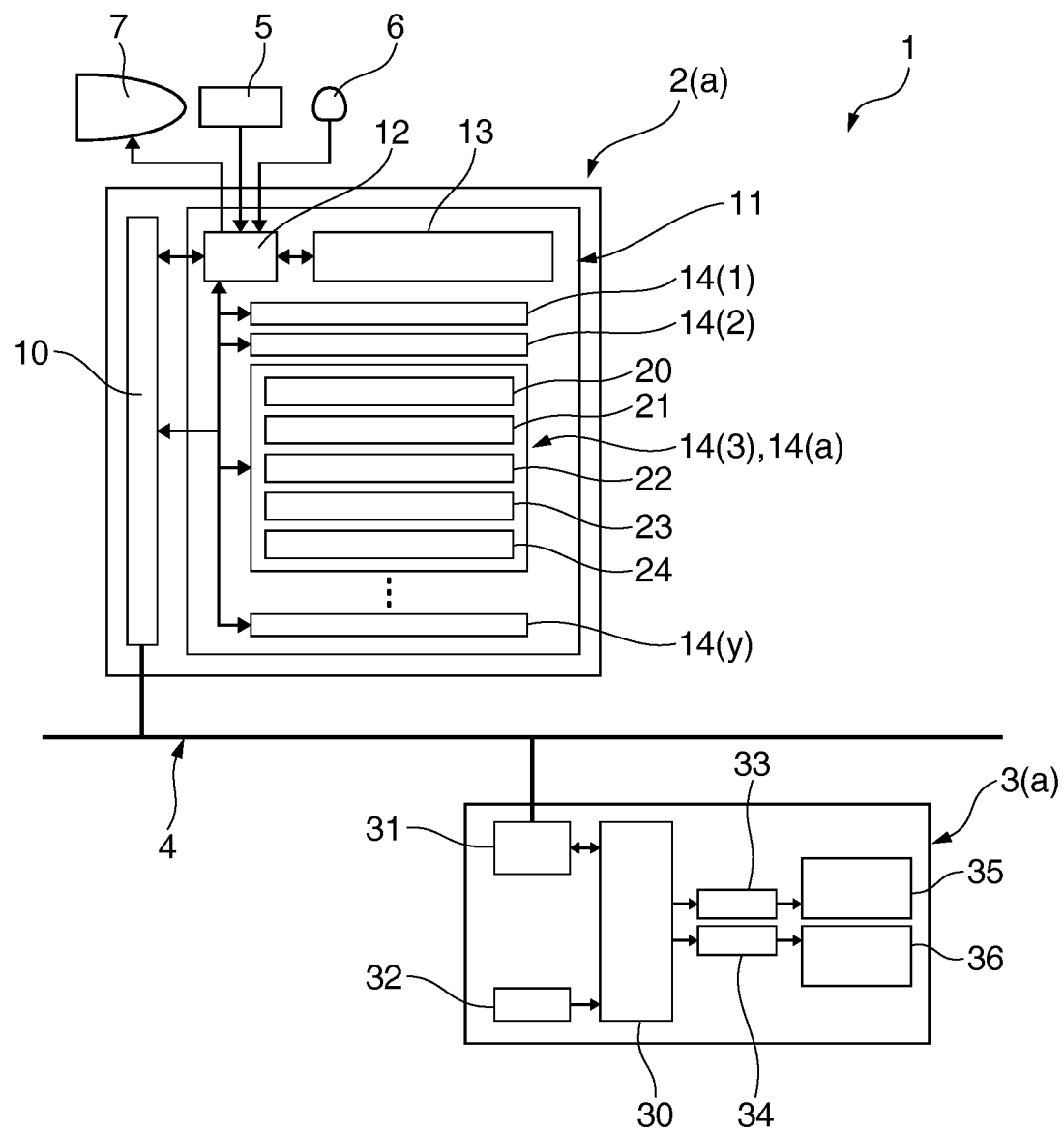
FIG. 2 is a block diagram of the control system of a network system according to the invention.

FIG. 2 is a block diagram of the control system of the network system 1. Each computer 2(1) to 2(x) has a communication interface 10 for connecting to the network 4, and a processor unit 11 including a CPU and memory.

The processor unit 11 runs the operating system 12, an application program 13, and printer drivers 14(1) to 14(y). The operating system 12, application program 13, and printer drivers 14(1) to 14(y) are started when each computer 2(1) to 2(x) starts up when the power supply of each computer 2(1) to 2(x) turns on. Each computer 2(1) to 2(x) has the same configuration.

The printer drivers 14(1) to 14(y) are programs (device drivers) for controlling driving the printers 3(1) to 3(y) over the network 4, and correspond 1:1 to the printers 3(1) to 3(y). The same number of printer drivers 14(1) to 14(y) as the number of printers 3(1) to 3(y) connected to the network 4 are therefore installed and run on each computer 2(1) to 2(x). The printer drivers 14(1) to 14(y) all have the same configuration.

When print data for running a printing process on a specific printer 3(a) selected from among the plural printers 3(1) to 3(y) connected to the network 4 (printer 3(a) refers to a specific single printer 3 below) is output from the application program 13 running on a specific computer 2(a) in the group of plural computers 2(1) to 2(x) connected to the network 4 (computer 2(a) refers to a specific single computer 2 below), the print data is passed to the specific printer driver 14(a) that controls driving that specific printer 3(a) through the operating system 12. As a result, the specific printer driver 14(a) generates a print command (process command) from the print data, and sends the print command through the communication interface 10 to the specific printer 3(a). The specific printer 3(a) that receives the print command from the specific printer driver 14(a) then prints the print data (executes the process).

Each specific printer driver 14(a) includes a decision unit 20 that determines if the print command sent from the specific printer driver 14(a) is the first print command sent to the specific printer 3(a); an initialization command transmission unit 21 for sending an initialization command to the specific printer 3(a); a retransmission unit 22 for resending the initialization command; a startup status monitoring unit 23 for monitoring the startup status, which indicates that the power of the specific printer 3(a) changed from OFF to ON; and an operating status monitoring unit 24 that monitors the operating status indicating the operating state of the specific printer 3(a).

The initialization command includes an establish connection process command for establishing a connection between the specific computer 2(a) (the computer 2 having specific printer driver 14(a)) and the specific printer 3(a) to be driven and controlled by the specific printer driver 14(a); and an error checking process command for checking if there is an error in the specific printer 3(a).

The operating statuses include a busy status indicating that the specific printer 3(a) is printing; an error status indicating that an error, such as a no-paper error, has occurred in the specific printer 3(a); and a power-off status indicating that the power of the specific printer 3(a) changed from ON to OFF.

The first print command is the first print command that is sent from the specific computer 2(a) to the specific printer 3(a) after the specific computer 2(a) power turned on.

The decision unit 20 determines if the print command sent from the specific printer driver 14(a) to the specific printer 3(a) is the first print command sent after the specific computer 2(a) power turned on.

The initialization command transmission unit 21 sends a first initialization command to initialize the specific printer 3(a) when a print command is sent from the specific printer driver 14(a) to the specific printer 3(a), and that print command is the first print command. When a print command is sent from the specific printer driver 14(a) to the specific printer 3(a) but the print command is not the first print command sent to the specific printer 3(a), and the startup status monitoring unit 23 is not monitoring the startup status and the operating status monitoring unit 24 is not monitoring the operating status, the initialization command transmission unit 21 sends a second initialization command to initialize the specific printer 3(a). The print command not being the first print command sent to the specific printer 3(a), and the startup status monitoring unit 23 not monitoring the startup status and the operating status monitoring unit 24 not monitoring the operating status, happens when the power of the specific printer 3(a) was on at the time the first print command was sent from the specific printer driver 14(a) to the specific printer 3(a), and the power of the specific printer 3(a) then turned off.

When the startup status is detected by the startup status monitoring unit 23, the retransmission unit 22 resends the first initialization command or the second initialization command queued in the specific computer 2(a) to the specific printer 3(a). If a print command is queued in the specific computer 2(a), the retransmission unit 22 resends that print command with the first initialization command or the second initialization command.

The startup status monitoring unit 23 regularly sends an ICMP/TCP packet (ping request) to the specific printer 3(a), and monitors the startup status based on whether or not a response to the ping request is received. The operating status monitoring unit 24 communicates regularly with the specific printer 3(a) by regularly sending a UDP/TCP packet (report status command) to the specific printer 3(a), and thus acquires the operating status of the specific printer 3(a).

When the specific printer 3(a) is initialized based on the first initialization command from the initialization command transmission unit 21, the operating status monitoring unit 24 monitors the operating status of the specific printer 3(a) until the power of the specific printer 3(a) turns off. More specifically, if the specific printer 3(a) is on when the first print command is sent from the specific printer driver 14(a) to the specific printer 3(a), the specific printer 3(a) is initialized based on the first initialization command from the initialization command transmission unit 21, and communication is established between the specific printer driver 14(a) and the specific printer 3(a). The specific printer driver 14(a) therefore regularly communicates with the specific printer 3(a) and acquires the operating status of the specific printer 3(a) from initialization until the specific printer 3(a) turns off, that is, until the power-off status is detected.

When the specific printer 3(a) is initialized based on the second initialization command from the initialization command transmission unit 21, the operating status monitoring unit 24 monitors the operating status of the specific printer 3(a) until the power of the specific printer 3(a) turns off. More specifically, if the specific printer 3(a) was on at the time the first print command was sent from the specific printer driver 14(a) to the specific printer 3(a), but the power of the specific printer 3(a) then turned off, and then the specific printer 3(a) power turned on again then stayed on, the specific printer 3(a) is initialized based on the second initialization command from the initialization command transmission unit 21, and communication is established between the specific printer driver 14(a) and the specific printer 3(a). The specific printer driver 14(a) therefore regularly communicates with the specific printer 3(a) and acquires the operating status of the specific printer 3(a) from initialization until the specific printer 3(a) turns off, that is, until the power-off status is detected.

When the specific printer 3(a) is not initialized based on the first initialization command from the initialization command transmission unit 21, the startup status monitoring unit 23 monitors a first startup status, which indicates the power of the specific printer 3(a) changed from off to on. The specific printer 3(a) not being initialized based on the first initialization command from the initialization command transmission unit 21 means that the specific printer 3(a) power has been off continuously from the time the first print command was sent from the specific printer driver 14(a) to the specific printer 3(a). In this case, the startup status monitoring unit 23 monitors the first startup status by regularly sending a ping request to the specific printer 3(a).

When the specific printer 3(a) is not initialized based on the second initialization command from the initialization command transmission unit 21, the startup status monitoring unit 23 monitors a second startup status, which indicates the power of the specific printer 3(a) changed from off to on. The specific printer 3(a) not being initialized based on the second initialization command from the initialization command transmission unit 21 means that the power of the specific printer 3(a) was on when the first print command was sent from the specific printer driver 14(a) to the specific printer 3(a), but the power of that specific printer 3(a) then turned off and then remained off. In this case, the startup status monitoring unit 23 monitors the second startup status by regularly sending a ping request to the specific printer 3(a).

The specific printer driver 14(a) does not monitor the operating status or the startup status during the period from when the power of the specific computer 2(a) changes from off to on until a print command is sent to a specific printer 3(a).

When the operating status monitoring unit 24 detects from the power-off status that the power of the specific printer 3(a) turned off, the specific printer driver 14(a) does not monitor the operating status or the startup status until a new print command is sent to the specific printer 3(a) after the operating status monitoring unit 24 detects that the specific printer 3(a) is off.

The printers 3(1) to 3(y) are constructed around a control unit 30 including a CPU and memory as shown in FIG. 2. Connected to the control unit 30 are a communication interface 31 for communicating with the computers 2(1) to 2(x) over the network 4, and a variety of sensors 32 such as a paper detection sensor that detects if there is recording paper in the printer. A printhead 35, and a paper feed motor 36 for conveying recording paper, are connected to the output side of the control unit 30. The printers 3(1) to 3(y) are all configured identically.

When a ping request is received from a specific printer driver 14(a) operating on a specific computer 2(a), the control unit 30 responds to the ping request. When a report status command is received from the specific printer driver 14(a), the control unit 30 sends, for example, an error status indicating there is no paper based on the output of the paper detection sensor 32 to the specific printer driver 14(a). The control unit 30 may alternatively send a busy status indicating, for example, that printing is in progress based on the drive states of the printhead 35 and paper feed motor 36 to the specific printer driver 14($a$). When a print command is received from the specific printer driver 14($a$), the control unit 30 controls driving the printhead 35 and paper feed motor 36 to print on the recording paper.

While some of the printers 3(1) to 3($y$) may have the ability to actively report to each computer 2(1) to 2($x$) connected to the network 4 by broadcasting the operating status when the printer power changes from off to on, not all of the printers 3(1) to 3($y$) have a function for actively reporting their own operating status to each of the computers 2(1) to 2($x$) connected to the network 4. When the printers 3(1) to 3($y$) have a function for actively reporting their own operating status to each of the computers 2(1) to 2($x$) connected to the network 4, the printers 3(1) to 3($y$) are connected to the network 4 with the function turned off.

Printer Status Monitoring Operation of the Computer

Figure 3:
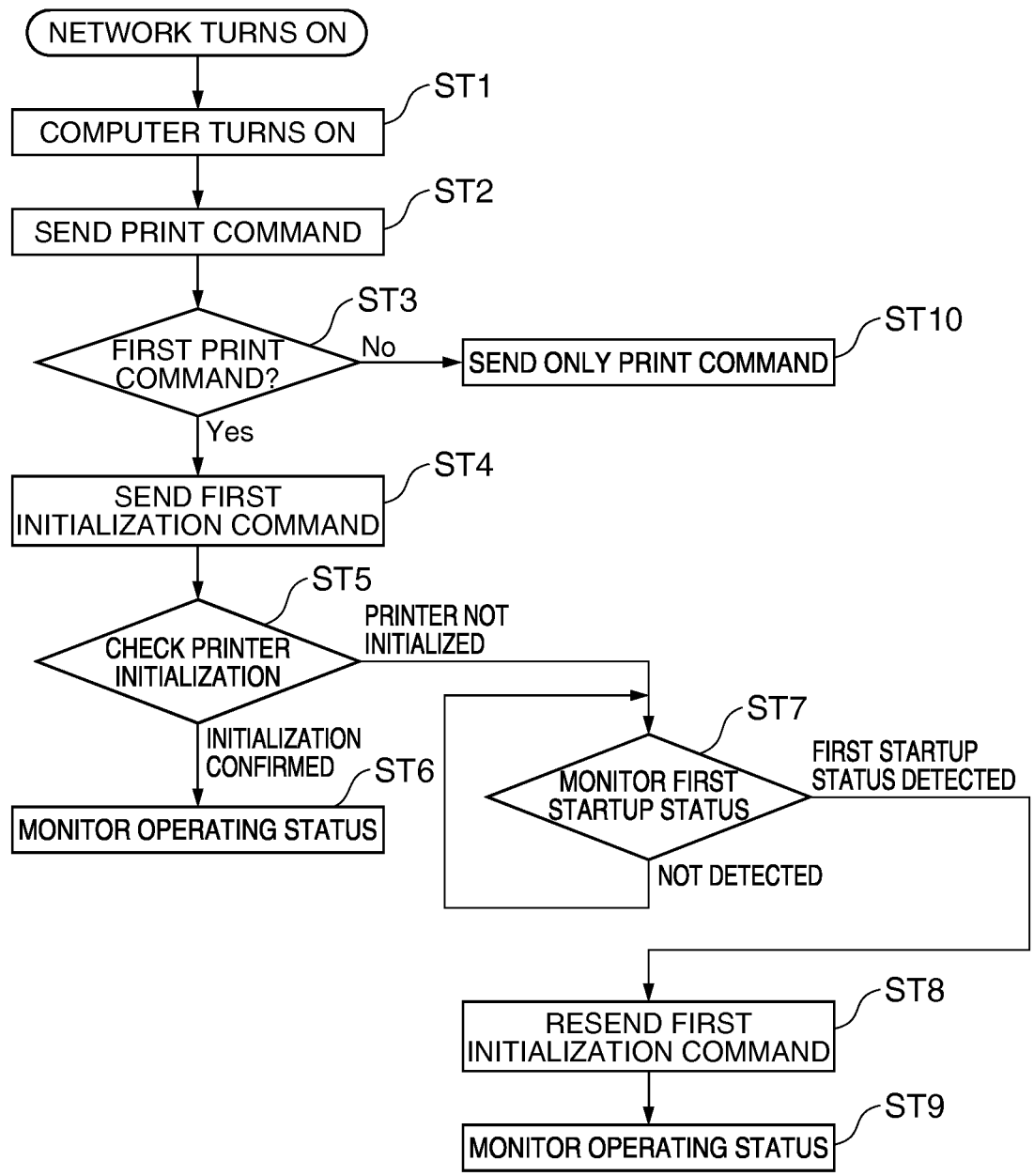
FIG. 3 is a flow chart of the status monitoring operation whereby a computer monitors the status of a printer during the network system startup process.

FIG. 3 is a flow chart of the operation whereby a specific computer 2($a$) monitors the status of a specific printer 3($a$) when the network system 1 starts. The status monitoring operation whereby a specific computer 2($a$) monitors the status of a specific printer 3($a$) when the network system 1 starts up and the power of each computer 2(1) to 2($x$) changes from off to on at the same time, is described below with reference to FIG. 3.

When a network system 1 in which the power of each computer 2(1) to 2($x$) changes from off to on at the same time starts up (step ST1), the printer drivers 14(1) to 14($y$) installed in each of the computers 2(1) to 2($x$) do not monitor the startup status and operating status of the printers 3(1) to 3($y$) controlled by the corresponding printer drivers 14(1) to 14($y$). The printer drivers 14(1) to 14($y$) installed in each of the computers 2(1) to 2($x$) also do not initialize the printers 3(1) to 3($y$). As a result, packets to monitor the startup status of the printers 3(1) to 3($y$), packets to monitor the operating status of the printers 3(1) to 3($y$), and packets to initialize the printers 3(1) to 3($y$) are not concentrated on the network 4 when the network system 1 starts operating. Concentration of a packet load on the network 4 can therefore be suppressed, and increasing the startup time until the printers 3(1) to 3($y$) can be used can be prevented.

When a print command is then sent from a specific printer driver 14($a$) installed on a specific computer 2($a$) to a specific printer 3($a$) (step ST2), and the print command is the first print command sent from the specific printer driver 14($a$) to the specific printer 3($a$) (step ST3 returns Yes), the initialization command transmission unit 21 of the specific printer driver 14($a$) sends this first print command and the first initialization command to the specific printer 3($a$) (step ST4).

When the first initialization command is sent, the specific computer 2($a$) checks if the specific printer 3($a$) was initialized based on the first initialization command (step ST5). If the specific printer 3($a$) was initialized based on the first initialization command, communication is established between the specific printer driver 14($a$) and the specific printer 3($a$), and the operating status monitoring unit 24 of the specific printer driver 14($a$) monitors the operating status of the specific printer 3($a$) until the power-off status is detected, that is, until the power of the specific printer 3($a$) turns off (step ST6). The specific printer 3($a$) also prints based on the print command.

Because a print command being output at the same time from all computers 2(1) to 2($x$) connected to the network 4 is rare, if the first initialization command is sent from that specific computer to initialize the specific printer 3($a$) and monitoring the operating status of the specific printer 3($a$) starts when a print command is sent from a specific printer driver 14($a$) to a specific printer 3($a$) for the first time, a concentration of packets for initializing the printers 3(1) to 3($y$) and packets for monitoring the operating status of the printers 3(1) to 3($y$) on the network 4 can be prevented. Load concentration on the network 4 can therefore be suppressed.

If initialization of the specific printer 3($a$) based on the first initialization command is not confirmed in step ST5, the power of the specific printer 3($a$) was not on when the network system 1 started up and remains off. The first initialization command and first print command are therefore not processed by the specific printer 3($a$), and remain queued on the specific computer 2($a$). In this case, the startup status monitoring unit 23 of the specific printer driver 14($a$) monitors the first startup status, which indicates that the power of the specific printer 3($a$) changed from off to on (step ST7).

When the startup status monitoring unit 23 detects the first startup status, that is, when the power of the specific printer 3($a$) changes from off to on, the retransmission unit 22 of the specific printer driver 14($a$) resends the first initialization command (step ST8). As a result, the specific printer 3($a$) is initialized based on the first initialization command. Communication between the specific computer 2($a$) and a specific peripheral device is established by this initialization, and the operating status monitoring unit 24 starts monitoring the operating status. The operating status monitoring unit 24 then continues monitoring the operating status until the power-off status is detected, that is, until the specific printer 3($a$) turns off (step ST9).

When the retransmission unit 22 resends the first initialization command, the retransmission unit 22 also resends the first print command queued on the specific computer 2($a$) side. The specific printer 3($a$) that turned on therefore executes the process based on the first print command without delay.

If initialization of the specific printer 3($a$) is confirmed in step ST5 when a second or further print command is sent from the specific computer 2($a$) to the specific printer 3($a$) before the first startup status is detected, that is, when step ST3 determines that the print command is not the first print command, the operating status monitoring unit 24 is monitoring the operating status (step ST6). As a result, the specific computer 2($a$) sends only the second or subsequent print command (step ST10) to the specific printer 3($a$) instead of sending the first initialization command from the initialization command transmission unit 21 with the second or subsequent print command. As a result, the specific printer 3($a$) prints based on the second or later print command.

If step ST3 determines that the print command is not the first print command, and initialization of the specific printer 3($a$) is not confirmed in step ST5, the startup status monitoring unit 23 is monitoring the first startup status in the next step ST7, and only the second or later print command is therefore sent (step ST10) instead of the first initialization command being sent from the initialization command transmission unit 21 with the second or subsequent print command. However, because the power of the specific printer 3($a$) remains off, the second or later print command is queued with the first print command on the specific computer 2($a$) side. Therefore, when the first startup status is detected in the next step ST7, the retransmission unit 22 also resends the queued first print command and second or later process command when resending the first initialization command in step ST8. As a result, when the specific printer 3($a$) turns on, printing based on the second or later print command can proceed without delay after printing based on the first print command.

Figure 4:
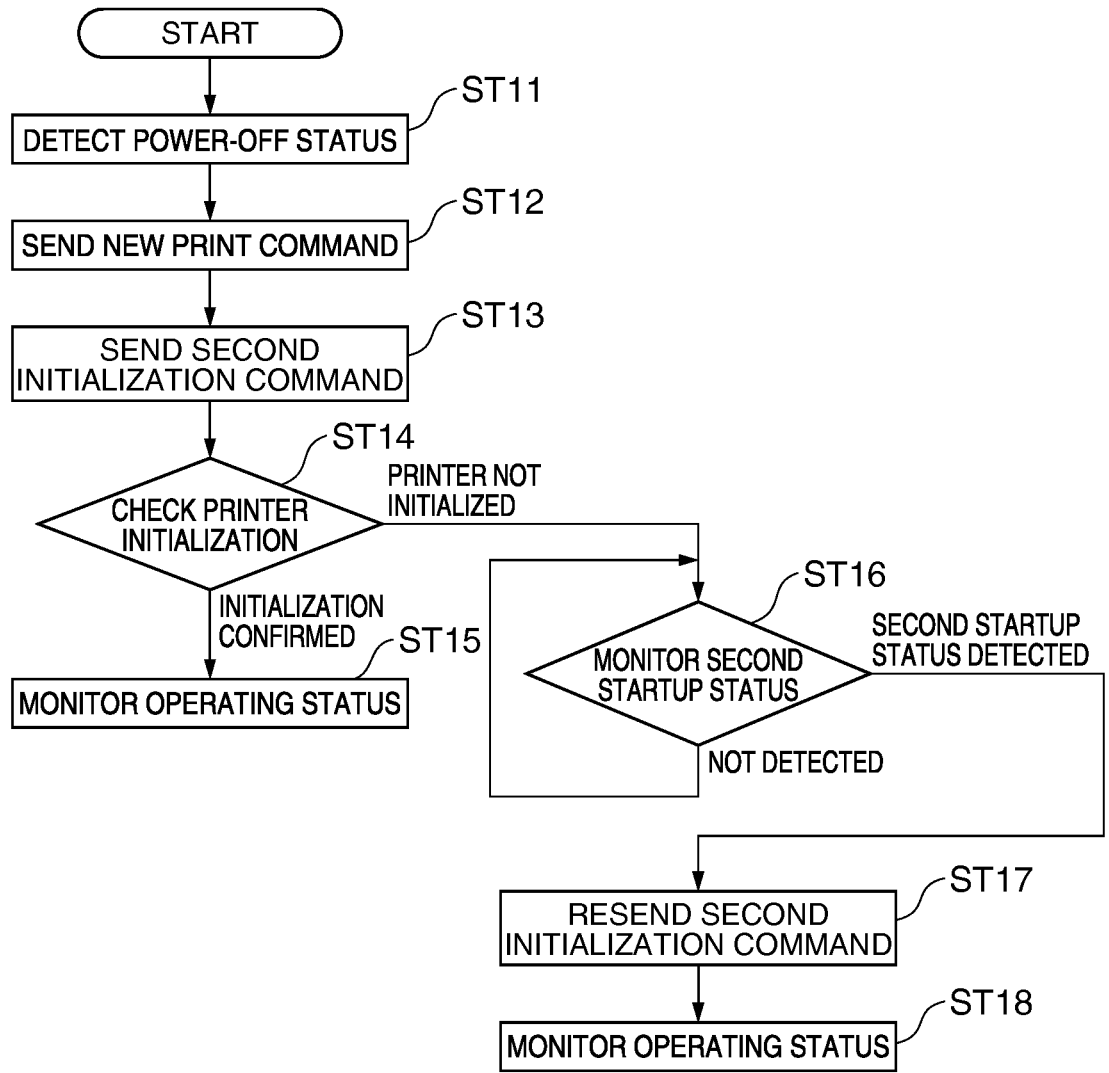
FIG. 4 is a flow chart of the status monitoring operation whereby a computer monitors the status of a printer when the printer power is interrupted while the printer is being monitored.

FIG. 4 is a flow chart showing the status monitoring operation of a specific printer 3(a) by a specific computer 2(a) when the power of the specific printer 3(a) turns off while being monitored. In the case shown in FIG. 4, the power of the specific printer 3(a) is on when the first print command is sent to the specific printer 3(a) from the specific printer driver 14(a) of the specific computer 2(a), and the operating status was being monitored by the operating status monitoring unit 24 of the specific printer driver 14(a), but the specific printer 3(a) power then turned off.

In this situation the operating status monitoring unit 24 detects that the specific printer 3(a) power turned off based on the operating status (power-off status) (step ST11). When the power of a specific printer 3(a) is detected to have turned off, the specific printer driver 14(a) stops monitoring the operating status and startup status of the specific printer 3(a) until a new print command is sent to the specific printer 3(a). Packets for monitoring the startup status and packets for monitoring the operating status can therefore be reduced, and the load on the network 4 can be reduced.

When a print command is then sent from a specific printer driver 14(a) running on the specific computer 2(a) to the specific printer 3(a) (step ST12), the initialization command transmission unit 21 of the specific printer driver 14(a) sends a second initialization command with the print command (step ST13). More specifically, because the specific computer 2(a) is not monitoring the operating status and startup status of the specific printer 3(a) at the time the new print command is sent, a second initialization command is sent from the initialization command transmission unit 21 with the new print command.

When the second initialization command is sent, the specific computer 2(a) checks if the specific printer 3(a) was initialized based on the second initialization command (step ST14). Because communication between the specific printer driver 14(a) and the specific printer 3(a) is established when initialization of the specific printer 3(a) is completed based on the second initialization command, the operating status monitoring unit 24 of the specific printer driver 14(a) monitors the operating status until the power-off status is detected, that is, until the power of the specific printer 3(a) turns off (step ST15). The specific printer 3(a) also prints based on the new print command.

If initialization of the specific printer 3(a) based on the second initialization command is not confirmed in step ST14, the second initialization command and new print command are not processed by the specific printer 3(a) and are queued on the specific computer 2(a) side because the specific printer 3(a) power remains off. In this case, the startup status monitoring unit 23 of the specific printer driver 14(a) monitors the second startup status, which indicates that the power of the specific printer 3(a) changed from off to on (step ST16).

When the second startup status is detected by the startup status monitoring unit 23, that is, when the specific printer 3(a) power changes from off to on, the retransmission unit 22 of the specific printer driver 14(a) resends the second initialization command (step ST17). As a result, the specific printer 3(a) is initialized based on the second initialization command. Communication between the specific computer 2(a) and the specific peripheral device is also established by initialization, and the operating status monitoring unit 24 starts monitoring the operating status. The operating status monitoring unit 24 then continues monitoring the operating status until the power-off status is detected, that is, until the power of the specific printer 3(a) turns off (step ST18).

When the retransmission unit 22 resends the second initialization command, the retransmission unit 22 also resends the new print command queued on the specific computer 2(a) side. The specific printer 3(a) that turned on therefore executes the process based on the new print command without delay.

Another print command could be sent from the specific computer 2(a) to the specific printer 3(a) before the second startup status is detected. If initialization of the specific printer 3(a) is confirmed in step ST14 in this case, the operating status monitoring unit 24 is monitoring the operating status (step ST15), and only the print command is sent to the specific printer instead of sending the second initialization command from the initialization command transmission unit 21 with the print command. As a result, the specific printer 3(a) prints based on the print command.

If initialization of the specific printer 3(a) is not confirmed in step ST14 when another print command is sent from the specific computer 2(a) to the specific printer 3(a) before the second startup status is detected, the startup status monitoring unit 23 is monitoring the second startup status in the next step ST16. As a result, only the print command is sent to the specific printer 3(a) instead of the second initialization command being sent from the initialization command transmission unit 21 with the print command. However, because the power of the specific printer 3(a) remains off, the print command is queued with the new print command on the specific computer 2(a) side. Therefore, when the second startup status is next detected in step ST16, the retransmission unit 22 resends the queued new print command and later process commands in step ST17 when the second initialization command is resent. As a result, the specific printer 3(a) that turned on can print based on the following print commands without delay following printing based on the new print command.

Other Embodiments

A network system 1 according to this embodiment of the invention has a plurality of computers 2(1) to 2(x) and a plurality of printers 3(1) to 3(y) connected through a network 4. However, if applied to any network system having three or more devices including at least one computer and one peripheral device connected over a network, the invention can prevent a concentration of packets for initializing peripheral devices and packets for monitoring the operating status of the peripheral devices on the network when the network system starts up by turning the computer power on.

The peripheral devices connected to the network 4 in the network system 1 described above are all printers 3(1) to 3(y), but the peripheral devices are not limited to printers. More particularly, the invention can also be applied to computers 2(1) to 2(x) monitoring the startup status and operating status of peripheral devices such as media publishers that write information to optical media such as DVDs, storage devices, and scanners connected to a network.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A method of monitoring the status of a peripheral device on a network having connected thereto at least one computer and one peripheral device, wherein a specific computer:

sends a first initialization command to initialize communication with a specific peripheral device when first sending a process command causing the specific peripheral device to perform an operation; and when the specific peripheral device is initialized based on the first initialization command, monitors the operating status indicating the operating state of the specific peripheral device until the power of the specific peripheral device turns off.

2. The method of monitoring the status of a peripheral device described in claim 1, wherein the specific computer:
   monitors a first startup status that indicates the power of the specific peripheral device changed from off to on when the specific peripheral device is not initialized based on the first initialization command;
   resends the first initialization command when the first startup status is detected; and
   monitors the operating status of the specific peripheral device until the power of the specific peripheral device turns off after the specific peripheral device is initialized based on the first initialization command.

3. The method of monitoring the status of a peripheral device described in claim 2, wherein the specific computer:
   sends a second initialization command to initialize communication with a specific peripheral device when a second or later process command is sent to the specific peripheral device and the operating status and first startup status of the specific peripheral device are not being monitored; and
   monitors the operating status of the specific peripheral device until the power of the specific peripheral device turns off after the specific peripheral device is initialized based on the second initialization command.

4. The method of monitoring the status of a peripheral device described in claim 3, wherein the specific computer:
   monitors a second startup status that indicates the power of the specific peripheral device changed from off to on when the specific peripheral device is not initialized based on the second initialization command;
   resends the second initialization command when the second startup status is detected; and
   monitors the operating status of the specific peripheral device until the power of the specific peripheral device turns off after the specific peripheral device is initialized based on the second initialization command.

5. The method of monitoring the status of a peripheral device described in claim 1, wherein the specific computer:
   does not monitor the operating status of the specific peripheral device and the startup status that indicates the power of the specific peripheral device changed from off to on until the specific computer sends a process command to the specific peripheral device for the first time after the power of the specific computer changes from off to on.

6. The method of monitoring the status of a peripheral device described in claim 1, wherein the specific computer:
   does not monitor the operating status of the specific peripheral device and the startup status that indicates the power of the specific peripheral device changed from off to on after detecting based on the operating status that the power of the specific peripheral device turned off until the specific computer sends a new process command to the specific peripheral device.

7. The method of monitoring the status of a peripheral device described in claim 1, wherein:
   the peripheral device is a printer; and
   the process command is a print command causing the printer to print.

8. The method of monitoring the status of a peripheral device described in claim 1, wherein:
   three or more devices including at least one computer and one peripheral device are connected to the network.

9. A computer on which operates a device driver that controls driving a peripheral device over a network to which at least one peripheral device and one computer are connected, the device driver comprising:
   a decision unit that determines if a process command is the first process command sent to a specific peripheral device when a process command to perform an operation is sent to a specific peripheral device that is controlled by the device driver;
   an initialization command transmission unit that sends a first initialization command to initialize communication between the device driver and the specific peripheral device when the process command is the first process command; and
   an operating status monitoring unit that, when initialization based on the first initialization command is completed, monitors the operating status indicating the operating state of the specific peripheral device until the power of the specific peripheral device turns off.

10. The computer described in claim 9, further comprising:
    a startup status monitoring unit that monitors a first startup status that indicates the power of the specific peripheral device changed from off to on when the specific peripheral device is not initialized based on the first initialization command;
    a retransmission unit that resends the first initialization command when the first startup status is detected.

11. The computer described in claim 10, wherein:
    the initialization command transmission unit sends a second initialization command to initialize communication between the device driver and the specific peripheral device when the device driver sends the process command to the specific peripheral device if the process command is not the first process command sent to the specific peripheral device, the startup status monitoring unit is not monitoring the first startup status, and the operating status monitoring unit is not monitoring the operating status; and
    the operating status monitoring unit monitors the operating status of the specific peripheral device until the power of the specific peripheral device turns off after the specific peripheral device is initialized based on the second initialization command.

12. The computer described in claim 11, wherein:
    the startup status monitoring unit monitors a second startup status that indicates the power of the specific peripheral device changed from off to on when the specific peripheral device is not initialized based on the second initialization command; and
    the retransmission unit resends the second initialization command when the second startup status is detected.

13. The computer described in claim 9, wherein:
    the peripheral device is a printer; and
    the process command is a print command causing the printer to print.

14. The computer described in claim 9, wherein:
    three or more devices including at least one computer and one peripheral device are connected to the network.

15. A network system having at least one computer and one peripheral device connected over a network, wherein:
    when a process command causing a specific peripheral device to perform an operation is first sent from a specific computer, a first initialization command to initialize communication between the specific computer and the specific peripheral device is sent from the specific computer; and when the specific peripheral device is initialized based on the first initialization command, the specific computer monitors the operating status indicating the operating state of the specific peripheral device until the power of the specific peripheral device turns off.

16. The network system described in claim 15, wherein:
the peripheral device is a printer; and
the process command is a print command causing the printer to print.

17. The network system described in claim 15, wherein:
three or more devices including at least one computer and one peripheral device are connected to the network.

* * * * *